United States Patent
Sheridan et al.

(10) Patent No.: US 9,288,534 B2
(45) Date of Patent: Mar. 15, 2016

(54) SYSTEMS AND METHODS FOR OPERATING MEDIA DEVICES

(75) Inventors: Gene Sheridan, Palo Verdes Estates, CA (US); Hooman Kashef Hamadani, Coto De Caza, CA (US); Ramanathan Subramaniam, Old Bridge, NJ (US)

(73) Assignee: SMSC Holdings S.A.R.L., Luxembourg (LU)

( * ) Notice: Subject to any disclaimer, the term of this patent is extended or adjusted under 35 U.S.C. 154(b) by 1073 days.

(21) Appl. No.: 13/106,135

(22) Filed: May 12, 2011

(65) Prior Publication Data

US 2011/0304443 A1 Dec. 15, 2011

Related U.S. Application Data

(60) Provisional application No. 61/333,896, filed on May 12, 2010.

(51) Int. Cl.

| | |
|---|---|
| *G05B 11/01* | (2006.01) |
| *H04N 21/4402* | (2011.01) |
| *H04N 7/16* | (2011.01) |
| *H04N 21/41* | (2011.01) |
| *H04N 21/422* | (2011.01) |
| *H04N 21/436* | (2011.01) |

(52) U.S. Cl.
CPC ....... *H04N 21/440218* (2013.01); *H04N 7/163* (2013.01); *H04N 21/4122* (2013.01); *H04N 21/4126* (2013.01); *H04N 21/42204* (2013.01); *H04N 21/43615* (2013.01)

(58) Field of Classification Search
USPC .......................................... 340/12.5
See application file for complete search history.

(56) References Cited

U.S. PATENT DOCUMENTS

| | | | |
|---|---|---|---|
| 6,563,430 B1 * | 5/2003 | Kemink | H04N 21/42202 340/12.22 |
| 7,034,891 B2 * | 4/2006 | Joung | H04N 5/45 348/565 |
| 7,039,643 B2 | 5/2006 | Sena et al. | |
| 7,092,326 B2 | 8/2006 | Becker et al. | |
| 7,257,641 B1 | 8/2007 | VanBuskirk et al. | |
| 7,412,727 B2 | 8/2008 | Kim et al. | |
| 7,467,220 B2 | 12/2008 | del Val et al. | |
| 7,555,715 B2 | 6/2009 | Randall et al. | |
| 7,630,781 B2 | 12/2009 | Chin | |
| 7,752,327 B2 | 7/2010 | Li | |
| 7,783,773 B2 | 8/2010 | Wu et al. | |
| 7,865,366 B2 | 1/2011 | Johnson et al. | |
| 7,877,497 B2 | 1/2011 | Kirkland | |

(Continued)

FOREIGN PATENT DOCUMENTS

| | | |
|---|---|---|
| EP | 1796389 | 6/2007 |
| WO | 2010/019408 | 2/2010 |

OTHER PUBLICATIONS

International Search Report and Written Opinion in Application No. PCT/US2011/036219 dated Jan. 31, 2012, 23 pages.

(Continued)

*Primary Examiner* — Naomi Small
(74) *Attorney, Agent, or Firm* — Slayden Grubert Beard PLLC

(57) ABSTRACT

A wireless adapter enables communication between a content source and a content player for rendering of content at the content source by the content player, and a remote controller allows for control of the content delivery, and one or more features of the content source, player, or both.

17 Claims, 10 Drawing Sheets

(56) References Cited

U.S. PATENT DOCUMENTS

| | | | |
|---|---|---|---|
| 7,991,801 B2 | 8/2011 | Chen et al. | |
| 8,005,988 B2 | 8/2011 | Maes | |
| 8,019,200 B2 | 9/2011 | Ong et al. | |
| 8,244,179 B2* | 8/2012 | Dua | 455/41.2 |
| 2001/0011940 A1* | 8/2001 | Williams | F16K 1/36 340/3.9 |
| 2001/0021998 A1 | 9/2001 | Margulis | |
| 2002/0059637 A1* | 5/2002 | Rakib | 725/119 |
| 2005/0024226 A1* | 2/2005 | Hayes | G08C 19/28 340/12.28 |
| 2005/0117910 A1* | 6/2005 | Foote | H04B 10/116 398/106 |
| 2005/0195099 A1* | 9/2005 | Vidal | 341/176 |
| 2005/0261062 A1* | 11/2005 | Lewin | A63F 13/12 463/42 |
| 2006/0010476 A1* | 1/2006 | Kelly | H04N 7/17318 725/86 |
| 2006/0056449 A1* | 3/2006 | Morioka | H04L 12/2803 370/466 |
| 2006/0209745 A1* | 9/2006 | MacMullan et al. | 370/328 |
| 2006/0262221 A1 | 11/2006 | Yuasa et al. | |
| 2007/0088812 A1* | 4/2007 | Clark | H04L 12/2803 709/223 |
| 2007/0143801 A1 | 6/2007 | Madonna et al. | |
| 2007/0169115 A1* | 7/2007 | Ko et al. | 717/174 |
| 2007/0192802 A1 | 8/2007 | Chen et al. | |
| 2007/0296552 A1* | 12/2007 | Huang et al. | 340/10.5 |
| 2008/0133597 A1* | 6/2008 | Bardsley | G06F 17/30477 |
| 2009/0055549 A1 | 2/2009 | Niwa et al. | |
| 2009/0100495 A1 | 4/2009 | Manapragada et al. | |
| 2010/0131613 A1* | 5/2010 | Jonsson | H04L 12/281 709/218 |
| 2010/0162320 A1* | 6/2010 | Bennett | H04N 21/4113 725/54 |
| 2011/0156944 A1* | 6/2011 | Ward | H04L 12/2832 341/176 |
| 2011/0246566 A1 | 10/2011 | Kashef et al. | |
| 2011/0289229 A1 | 11/2011 | Subramaniam | |
| 2011/0295974 A1 | 12/2011 | Kashef et al. | |

OTHER PUBLICATIONS

Audio format, Wikipedia, the free encyclopedia, http://en.wikipedia.org/wiki/Audio_format, XP-002657813, 3 pages. [Retrieved Aug. 29, 2011].

DCT3416 Quick Start Guide, Motorola, http://www.westmancom.com/fileadmin/Storage/Support/DCT3416QuickStartGuide.pdf, 2007, XP-002657814, 2 pages. [Retrieved Aug. 28, 2011].

International Search Report and Written Opinion in Application No. PCT/US2011/038137 dated Nov. 25, 2011, 8 pages.

\* cited by examiner

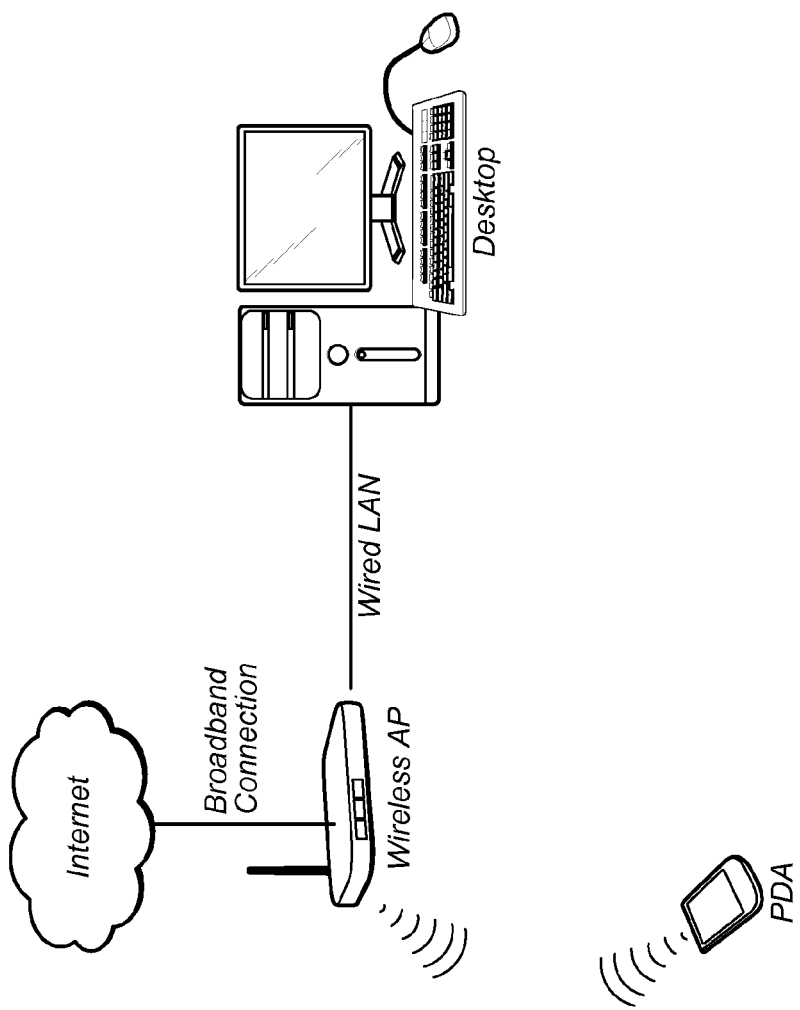
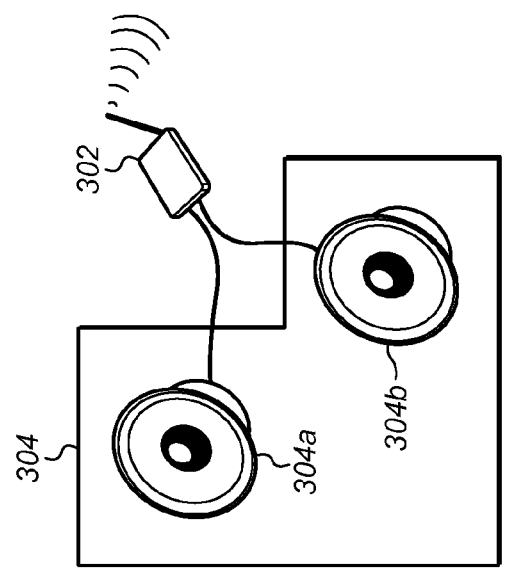
FIG. 3

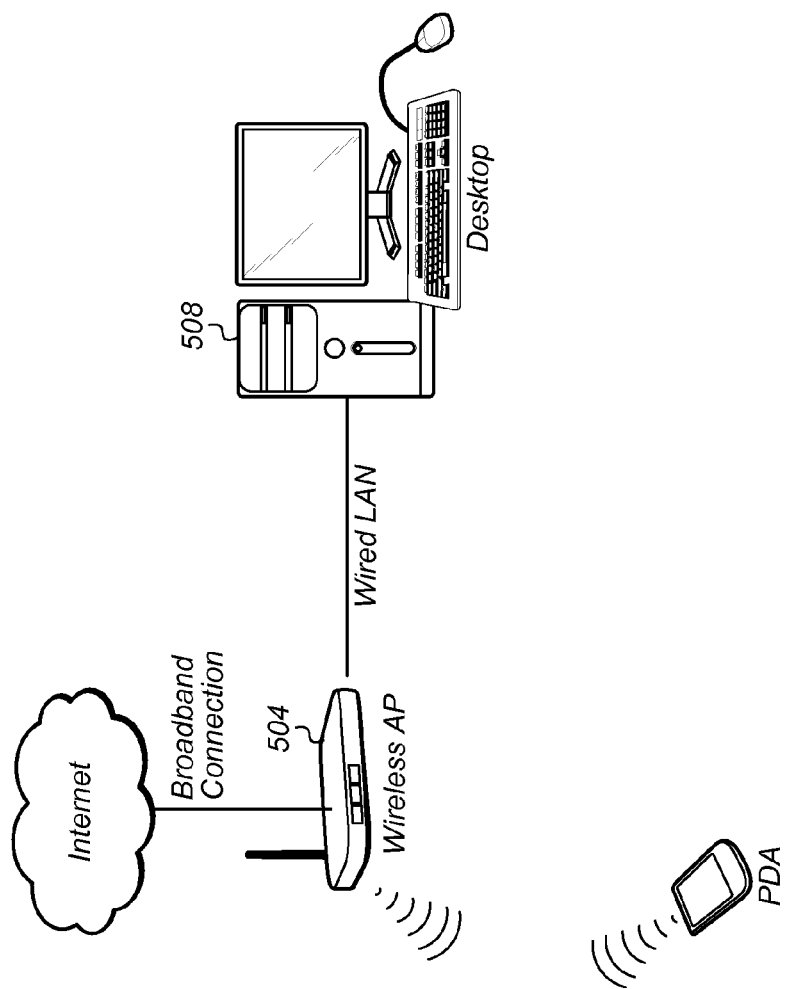
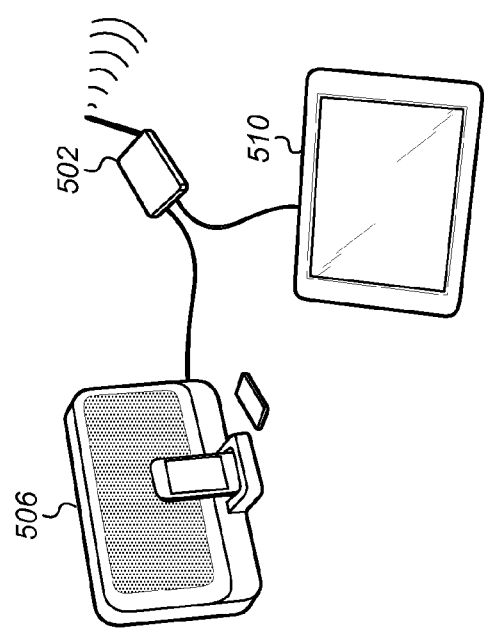
FIG. 5

SYSTEMS AND METHODS FOR OPERATING MEDIA DEVICES

CROSS-REFERENCE TO RELATED APPLICATIONS

This application claims priority to U.S. Provisional Application Ser. No. 61/333,896, filed May 12, 2010 the disclosure of which is incorporated herein by reference in its entirety.

FIELD OF THE INVENTION

In various embodiments, the present invention relates media devices and, in particular, to interconnected media devices.

BACKGROUND

In recent years, consumer electronics devices that access, store and play various kinds of content (e.g., music, video, etc.) have become increasingly popular. Such devices include, iPods that download and store music and video, network-enabled storage drives that store data, music, and video, satellite radios, and digital video recorders (DVRs) that store a variety of entertainment programming. At the same time, wireless networks have also become common in many households. Many content sources such as iPods, storage drives, satellite radios, and DVRs are designed to share the content they receive and/or store with other media devices via a home network. However, one problem in accessing the content from these sources is that some conventional media players such as TVs and audio systems typically lack networking capability. Therefore, these players cannot take advantage of a home network to access rich media available from other content sources and render such media. Some media players (e.g., Sony/Google TV) may be network enabled, but the addition of a specialized processor, a keyboard, and other hardware significantly increases the cost of such a player.

Another challenge when using multiple content sources and players relates to how to efficiently control them. Many devices such as DVRs, digital radios, audio-systems, and TVs can be controlled using a remote controller, typically provided with the device. It is cumbersome and impractical, however to carry around a number of remote controllers, one for controlling each of the content source and playback devices. Universal remote controllers, i.e., controllers that can be programmed to control more than one device, can alleviate this problem to some extent, but such controllers typically employ infra-red technology, and hence, their use is limited to situations in which the universal controller and the device to be controlled are within the line-of-sight of each other.

One approach to circumventing the line-of-sight problem is to use mobile computing devices such as smart phones (e.g., iPhones, Android-based phones), mobile PDAs (e.g., BlackBerrys), and tablet PCs to control various media devices (i.e., media players and sources) via a home network. In some instances, a user interface (UI) of a mobile computing device mimics a conventional remote controller. In other instances, the remote controller functionality on the media device is controlled by the mobile device taking advantage of the powerful UIs that may be supported thereon. In this, when remote controller functionality is launched on the mobile computing device, the media device (i.e., media player or source) provides a remote user interface to the mobile computing device, which is presented to a user via the display and/or UI of the mobile device. To this end, the device to be controlled typically obtains information about the mobile device (e.g., the device's display type and dimensions, communication protocol, etc.) and creates a suitable user interface (UI). A user then controls the media device by using the corresponding UI on the mobile device. All the actions initiated by the user are passed on to the media device, thereby causing a change in state of the media player (e.g., a change in volume, skipping to the next song, etc.). Furthermore, the media device may also determine the next UI to be presented to the user (as described in detail below). Generally, the mobile device communicates with the media device via a wireless home network, without requiring a line of sight between the mobile device and the media device.

This approach also faces many challenges, however. First, the media device must have the ability to wirelessly communicate with another device such as a mobile computing device. Second, the media device must be able to provide a suitable user interface on a mobile device. Third, even if a media device can configure known mobile computing devices, such devices are frequently modified and improved (e.g., their data-communication protocols, data formats, etc. are changed), and new devices become available. A media player designed to configure the known mobile devices may not be able to configure or interoperate with new and/or improved devices. Recall, also, that this solution only enables controlling a media device in a limited way, and does not allow rich media from various media sources to be accessed on a media player. Therefore, there is a need for improved systems and methods of operating various media sources and players.

SUMMARY

In various embodiments, the present invention facilitates rendering (i.e., playing or displaying) by a media player content items from one or more media sources. This is achieved, in part, using a wireless adapter that can access the content items via a wireless link such as a link through a wireless home network. If content available from the media source is not in a format the media player can play, the wireless adapter can reformat the received content items into a suitable format for rendering by the media player.

Additionally, a remote controller enables efficient control of various media devices i.e., sources and players. This is achieved, in part, by configuring a mobile device (e.g., cell phone, BlackBerry, etc.) as a remote controller for a media device by receiving at the mobile device information about features that can be controlled on the media device, while allowing the media device to remain agnostic to the mobile device. For example, a media player may identify to the remote controller the various media sources that the media player can access. The remote controller may use this information to present a list of options to the user and select and/or control the media source from which content items may be accessed and rendered. The features received include selection of a content type or item such as a song, picture, movie, etc., and selection of rendering options such as volume control, replay, pause, etc. Also, content from a number of content sources can be rendered by one or more players, and content delivery and features of the content sources and players can be conveniently controlled using a single remote controller.

Accordingly, in one aspect, embodiments the invention feature a wireless adaptor for communicating with a media source. The adapter includes a first wireless interface for receiving a content item from the media source via a wireless local-area network (WLAN). The content item is received in a first format (e.g., liner pulse-code modulation (LPCM), MP3, etc.). The wireless adapter also includes a media processor for converting the format of the received content item from the first format into a second format. In addition, the wireless adapter includes a second interface for delivering the content item in the second format to a media player. The media player may then render (i.e., play, display, etc.) the content item. The first and/or second formats may be liner pulse-code modulation (LPCM) or MP3. The second interface can be an analog audio connector, an S/PDIF connector, an HDMI connector, a USB connector, a wired Ethernet connector, an IEEE 1394 connector, or a 30-pin connector.

In another aspect, embodiments of the invention feature a remote controller for establishing a communication link between a media source and a media player. The remote controller includes a wireless interface configured to establish a first wireless communication link between the remote controller and the media player. The wireless interface is also configured to establish a second wireless communication link between the remote controller and the media source. The remote controller also includes a processor for controlling the media player, by providing a player command thereto via the first link, the media source, by providing a source command thereto via the second link, or both. As a result, the media player receives a content item, for rendering thereof, from the media source via a third wireless communication link. The first, second, and/or third wireless communication link may be established via a WLAN.

In some embodiments, the wireless interface is configured for receiving data from the media source via the second link, and the remote controller includes a display unit for displaying the received data. The remote controller may also include a user interface for receiving a user command. The player command provided to the media player, the source command provided to the media source, or both may be based on the received user command. In some embodiments, the remote controller further includes a scanner for identifying one or more media devices. The identified media devices can be the media player, and/or the media source, and/or a wireless adapter in communication with the media player or the media source.

In another aspect, embodiments of the invention feature a remote controller for controlling a media device. The remote controller includes a network interface for communicating with the media device. Communicating includes transmitting information to the media device and receiving information therefrom. The remote controller also includes a processor configured for analyzing the received information so as to identify one or more features of the media device. The processor is also configured for creating a controller for controlling the media device. The controller includes a user interface according to the one or more identified features. Moreover, the remote controller includes a display module for displaying the user interface.

The information transmitted to the media device may include a signal generated by the controller in response to a command received via the user interface. In some embodiments, the display module displays the information received from the media device. The received information may include data corresponding to a content item associated with the media device. The data corresponding to the content item can be one or more of a title of the content item, a type of the content item, and a performer of the content item.

The remote controller may also include a scanner for selecting the media device by scanning one or more media devices. In some embodiments, the network interface of the remote controller simultaneously communicates with one or more additional media devices. The processor analyzes the received information from each of the one or more additional media devices, and creates one or more additional controllers. Each controller controls the corresponding media device of the one or more additional media devices. The processor may aggregate the information received from the media device and the information received from each of the one or more additional media devices, and the display module may display the aggregated information.

In another aspect, embodiments of the invention feature a method of communicating with a media source. The method includes receiving a content item in a first format from a media source via a wireless local-area network (WLAN), and converting a format of the received content item from the first format into a second format. The method also includes delivering the content item in the second format to a media player for its rendering. The first and/or second formats can be liner pulse-code modulation (LPCM) and/or MP3. In some embodiments, the content item is delivered to the media player using an interface that may be an analog audio connector, an S/PDIF connector, an HDMI connector, a USB connector, a wired Ethernet connector, an IEEE 1394 connector, and/or a 30-pin connector.

In another aspect, embodiments of the invention feature a method for rendering a content item from a media source on a media player. The method includes establishing a first wireless communication link between a remote controller and the media player, and establishing a second wireless communication link between the remote controller and the media source. The method also includes establishing a third wireless communication link between the media source and the media player. Moreover, the method includes transmitting from the remote controller a player command to the media player via the first link, and/or a source command to the media source via the second link. This can cause the media player to receive a content item, for rendering thereof, from the media source over the third wireless communication link. The first, second, and/or third wireless communication links may be established via a WLAN.

In some embodiments, the method further includes receiving, at the remote controller, data from the media source via the second wireless communication link, and displaying the received data. The method may include receiving a user command at the remote controller via a user interface, such that the player command and/or the source command may be based on the received user command.

In some embodiments, the method includes identifying (e.g., selecting) one or more media devices from one or more media devices, such that one identified (e.g., selected) media device is the media player, the media source, or a wireless adapter in communication with the media player or the media source. Another media device may also be identified (e.g., selected) from one or more media devices, and the other media device can also be the media player, the media source, or a wireless adapter in communication with the media player or the media source.

In another aspect, embodiments of the invention feature a method for rendering a content item at a media source on a media player. The method includes selecting a media source, sending a request to the media source for information associated with content items at the media source, receiving the information associated with the content items, and processing and displaying the information. The method further includes receiving a command in response to the displayed information, identifying one or more content items according to the command, selecting a media player, and directing the media player and/or the media source to establish a wireless communication link between the two. In addition, the method includes directing the media source according to the one or more identified content items, that can cause transmission of the one or more identified content items from the media source to the media player via the communication link. These content items may then be rendered (e.g., played, displayed, etc.) by the media player.

In another aspect, embodiments of the invention feature a method for controlling a media device. The method includes creating a controller for the media device, and the creating step includes sending, from a user device, a request to the media device, and receiving information associated with one or more control features of the media device in response to the request. The creating step also includes identifying, at the user device, one or more control features of the media device using the received information, and creating, at the user device, a user interface according to the one or more identified control features.

In some embodiments, the method further includes receiving, via the user interface, a user command, and transmitting to the media device a feature-control command according to the received user command. This can cause a parameter of the media device to be adjusted. For example, the volume of a media player may be adjusted.

In some embodiments, the media device is a media source, an the method additionally includes receiving, at the user device, information about content items corresponding to the media source. Furthermore, the method includes processing and displaying the information about the content items, and receiving, via the user interface, a content-selection command identifying (e.g., selecting for rendering) one or more content items. The method also includes transmitting a signal to the media source according to the content-selection command, so that the one or more identified items may be transmitted by the media source to a media player.

In some embodiments, the media device is a first media source, and the method includes selecting a second media source configured for receiving wireless communication from a remote unit. The method also includes receiving, at the user device, information about content items corresponding to the first and second media sources, and aggregating, processing, and displaying the information about the content items. Moreover, the method includes receiving, via the user interface, a content-selection command identifying one or more content items. These identified (e.g., selected) content items may be available at the first and/or second media source. The method includes designating as a selected media source the first media source if the one or more identified content items correspond thereto, e.g., are stored at the first media source.

If the one or more identified content items corresponds to the second media source, the method includes designating as the selected media source the second media source. Finally, the method includes transmitting a signal to the selected media source according to the content-selection command, so that the one or more identified items may be transmitted by the selected media source (i.e., the first or second media source where one or more identified content items are available).

The media device may be a media player, a media source, or a wireless adapter in communication with a media player or a media source, and the method may include selecting the media device from one or more media devices configured for receiving wireless communication from a remote unit. In some embodiments, the user device is one of a cell phone, a wireless personal digital assistant, a tablet PC, and a wireless game console. Such a user device may be configured according to the method so as to function, in part, as a remote controller for a media device.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 3-5 each shows a media system in which a wireless adapter according to an embodiment of the invention provides content to two media players;

DESCRIPTION

Figure 1:
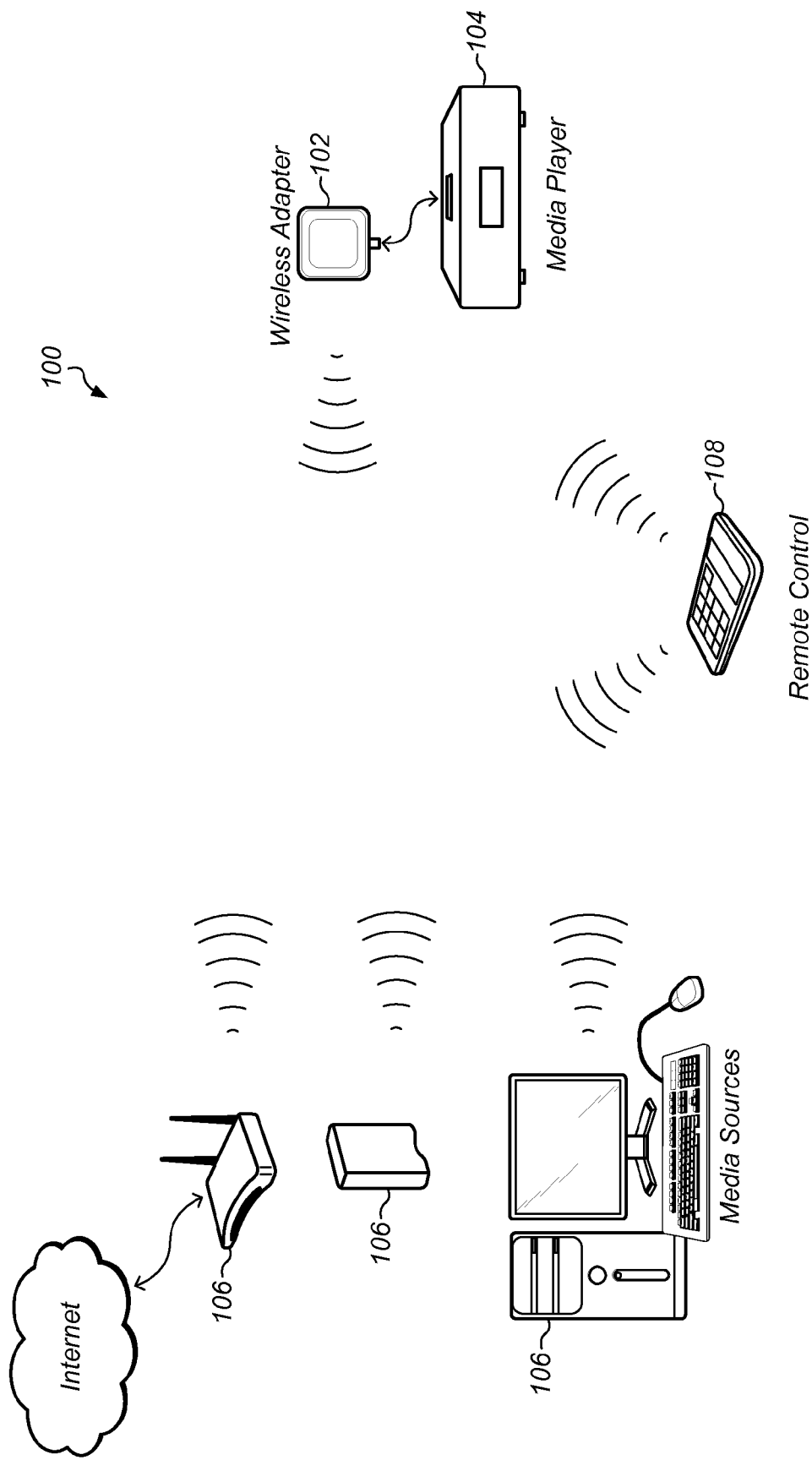
FIG. 1 shows an exemplary media system.

An exemplary media system shown in FIG. 1 includes a wireless adaptor 102 connected to a media player 104 via a wired interface provided by the media player 104. Typically, media players provide analog audio, S/PDIFF, HDMI, and Ethernet connectors as interfaces. Some media players also provide USB connectors, IEEE 1394 (also called Fire Wire), and/or a 30-pin connector (such as that available on certain Apple Computer, Inc. devices). The wireless adapter 102, fully described with reference to FIG. 2, includes a media processor 202, a wireless interface 204, and a wired interface 206, complementary to the interface provided by the media player 104 for connecting thereto. The exchange of data and control information occurs between the wireless adaptor 102 and the media player 104 via the wired interface 206. Moreover, power may also be supplied to the wireless adapter 102 from the media player 104 via the wired interface 206.

Figure 2:
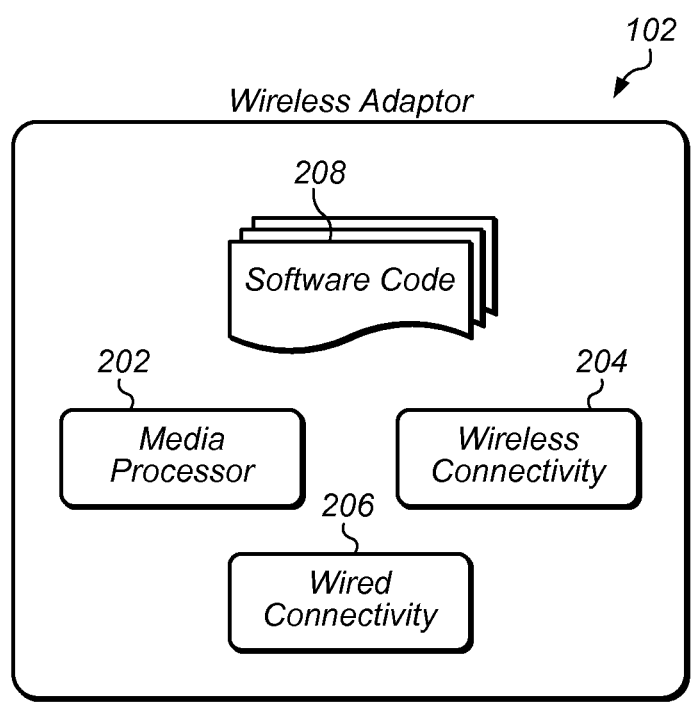
FIG. 2 schematically shows a wireless adapter according to one embodiment of the invention.

The single multi-purpose wired interface 206 generally features ease-of-use, set-up, and configuration to the users, and mitigates costs by avoiding a separate power supply for the adapter 102 and/or additional connectors between the adapter 102 and the media player 104. For example, in one embodiment the wireless adaptor does not require any special hardware from the consumer electronic device (i.e., media player) and connects to the media player without the need for installing any software driver (i.e., "Zero Install"). In general, this can be achieved by leveraging the existing capability of the media player and the wireless adapter emulating the behavior of the service that can be accessed using that capability. For example, the adapter may emulate itself as a Mass storage device on a USB interface, if the media player is capable of playing media files from the mass storage device. The remote multimedia service enabled by the adapter is, in effect, presented as a multimedia file which is then controlled by the media player. Though FIG. 2 shows only one wired interface 206, in other embodiments the wireless adapter may have more than one wired interfaces, each being complementary to a different kind of wired media-player interface. Thus, one wireless adapter can be used to provide wireless connectivity to more than one media players that provide different kinds of wired interfaces.

Using some wired interfaces, such as a USB connector or the Apple 30-pin connector, the wireless adaptor 102 can emulate the behavior of a device that is normally connected to the media player 104 using these interfaces. For example, using a USB connector as the wired interface 206, the wireless adaptor 104 can emulate the behavior of a USB Flash drive by presenting itself as a Mass Storage Device (MSD) to a USB host controller included the media player 104. The media player 104 may browse the content of the emulated Flash drive, i.e., the content accessed by the wireless adapter 104 as described below, in accordance with its normal operating procedures and select and play the desired content items. Similarly, when using an Apple 30-pin connector as the wired interface 206, the wireless adaptor 104 can emulate the behavior of an Apple device (iPod, iPhone, iTouch, iPad, etc.), thereby allowing the media player to browse, select, and control the media content accessed by the wireless adaptor 102.

The wireless adapter 102 also includes stored software code 208 that, when executed by the media processor 202, provides the functionality of the wireless adapter 102, as described below. Alternatively, the whole or part of the code 208 may be embedded into the media processor 202. The wireless adapter 102 receives content from one or more media sources 106 or control information from a remote controller 108 via the wireless interface 204. The received content may include songs, video clips, pictures, web-pages, and documents. The media sources 106 may deliver the content in a format that the media player connected to the wireless adapter 102 does not recognize. If the content is received via a home network, the wireless adapter 102 would typically receive IP packets from which the media content is extracted.

The media processor 202 and the code 208 perform media-content extraction and format conversion and/or transcoding, if necessary. For example, the processor 202 and the software code 208 can convert the streaming media content received via the wireless interface 204 into linear pulse-code modulation (LPCM) format and then further convert the digital LPCM format into an analog signal. The analog signal can be provided to the media player 104 via an analog-audio interface. The format may also be converted to one or more of Sony/Philips digital interconnect format (S/PDIF) (for connection via a Toshiba Link (TOSLINK), high-definition multimedia interface (HDMI) format (for connection via an HDMI interface), MP3 format, LPCM format (for connection via USB or Ethernet interfaces), and a vendor-specific format such as Apple device protocol (for connection via an Apple 30-pin connector). In some embodiments, the wireless adaptor 102 is built as a component of the media player 104, i.e., it may be located inside an enclosure of the media player 104, and may be permanently affixed thereto.

Figure 4:
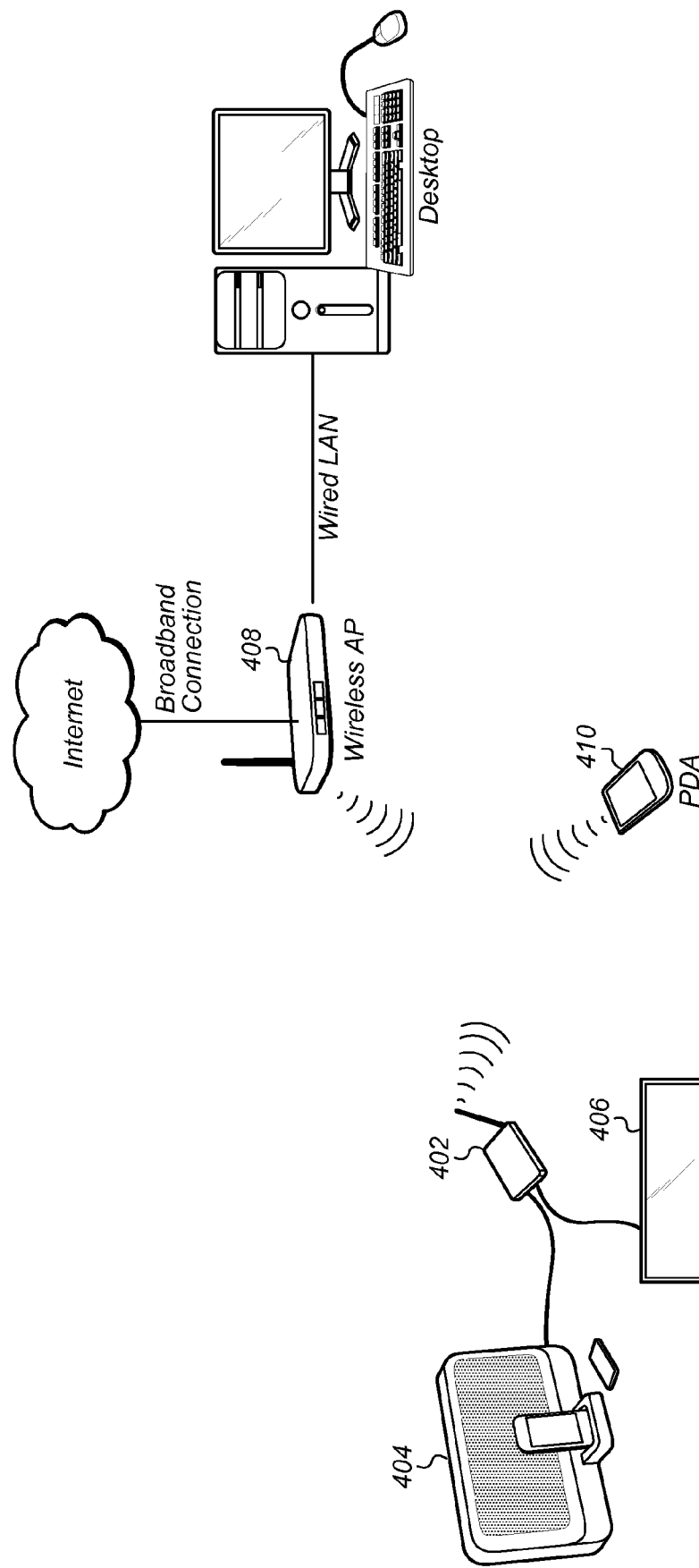

The wireless adapter 302 illustrated with reference to FIG. 3 simultaneously manages multiple media players, such as a 2-channel or multi-speaker system 304. The wireless adaptor 302 includes circuitry and/or software code to receive, interpret, and output different output media streams to different media players, e.g., right and left stereo channels for right and left speakers 304a, 304b, respectively. Similarly, the wireless adapter 402 shown in FIG. 4 is connected to a speaker system 404 for audio and a TV 406 for video. Thus, the wireless adaptor 402 is used to manage content streaming to an audio-visual system. In particular, a movie or television show selected for streaming over the Internet via a wireless access point (WAP) 408. As described in detail below, a remote controller 410 is used to configure the WAP 408 (i.e., a media source) to stream the movie or television show to the wireless adaptor 402. The wireless adaptor 402 may then send a video portion of the content to the TV 406, and an audio portion of the content to the speaker system 404 for playback thereon, respectively.

In the media system shown in FIG. 5, the wireless adaptor 502 performs two content-accessing tasks concurrently, i.e., the adapter 502 receives from a WAP 504 streaming audio for playback by a sound system 506, and it simultaneously receives digital photos from a network-connected PC 508 and stores them on a digital photo display 510. Although in the systems depicted in FIGS. 3-5 each wireless adapter delivers content to two media players, it should be understood that this is for illustration only, and that wireless adapters that can supply content to more than two media players are within the scope of the invention.

Figure 6:
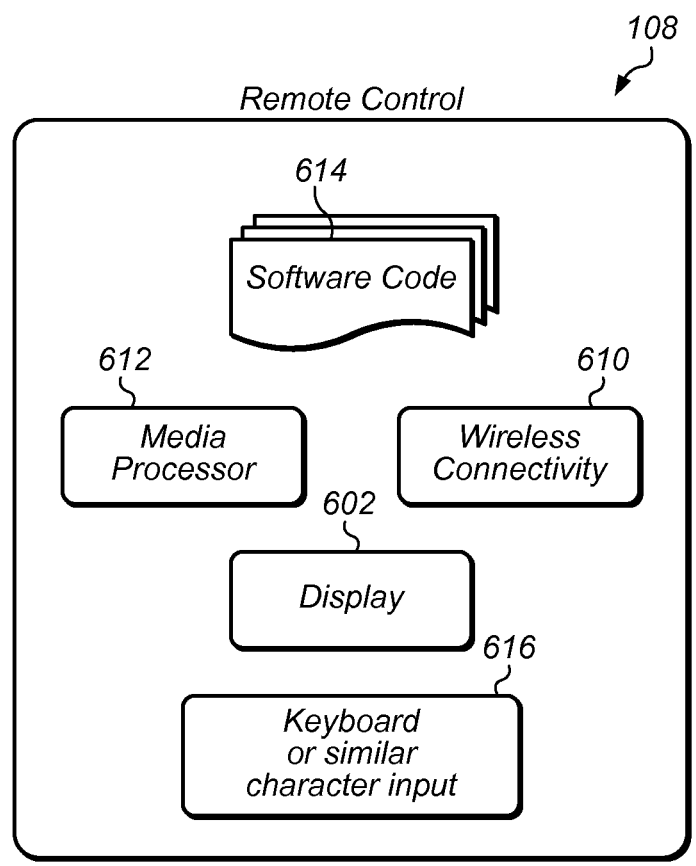
FIG. 6 schematically shows an exemplary remote controller.

As described above with reference to FIGS. 1 and 2, the wireless adapter 102 enables rendering of content items received from one or more media sources 106 by the media player 104. The remote control (RC) 108 depicted in FIG. 6, enables controlling the media sources 106, the media player 104, or both. The RC 108 includes a display 602, a wireless interface 610, a media processor 612, software code 614, and a keyboard 616. Using the wireless interface 610, the RC 108 establishes communication with the wireless adapter 102 in communication with a media player 102. In addition, the RC 108 establishes communication with one or more media sources 106 using the wireless interface 610. The media sources 106 may include, but are not limited to, a PC, network attached storage (NAS), an Access Point (AP) that accesses content from the Internet, a portable device (e.g., a personal digital assistant (PDA), a cell phone, a wireless MP3 player, etc.), a satellite radio, and a satellite-connected DVR. The display 602 and the keyboard 616 form a user interface using which a user can provide commends that may be processed by the media processor 612 and the code 614, and forwarded to the media player 102 and/or the media source 106 using the wireless interface 610.

In some embodiments, the display 602 is a touch screen, and the keyboard 616 is simulated in the touch screen 602. In some instances, a smart phone (e.g., iPhone, Android-based phone, etc.) having a wireless connection, ease-of-use keyboards or character inputs, and a processor may be configured as the RC 108 by downloading and executing on the smart phone additional software. By using existing, popular smart phones, the consumer does not need to incur large incremental costs for a new, additional remote controller. Furthermore, by using industry-standard protocols that may be integrated with the downloaded software code, the smart phone configured as the RC 108 may interact with diverse types of media sources, access content, and establish transfer of content among these media sources using the wireless adapter 102. The industry-standard protocols include DLNA, UPnP, protocols from Microsoft for Windows-based device control, and protocols from Apple for controlling iPod, iPhone, iPad, and/or iTunes-accessing devices.

Figure 7:
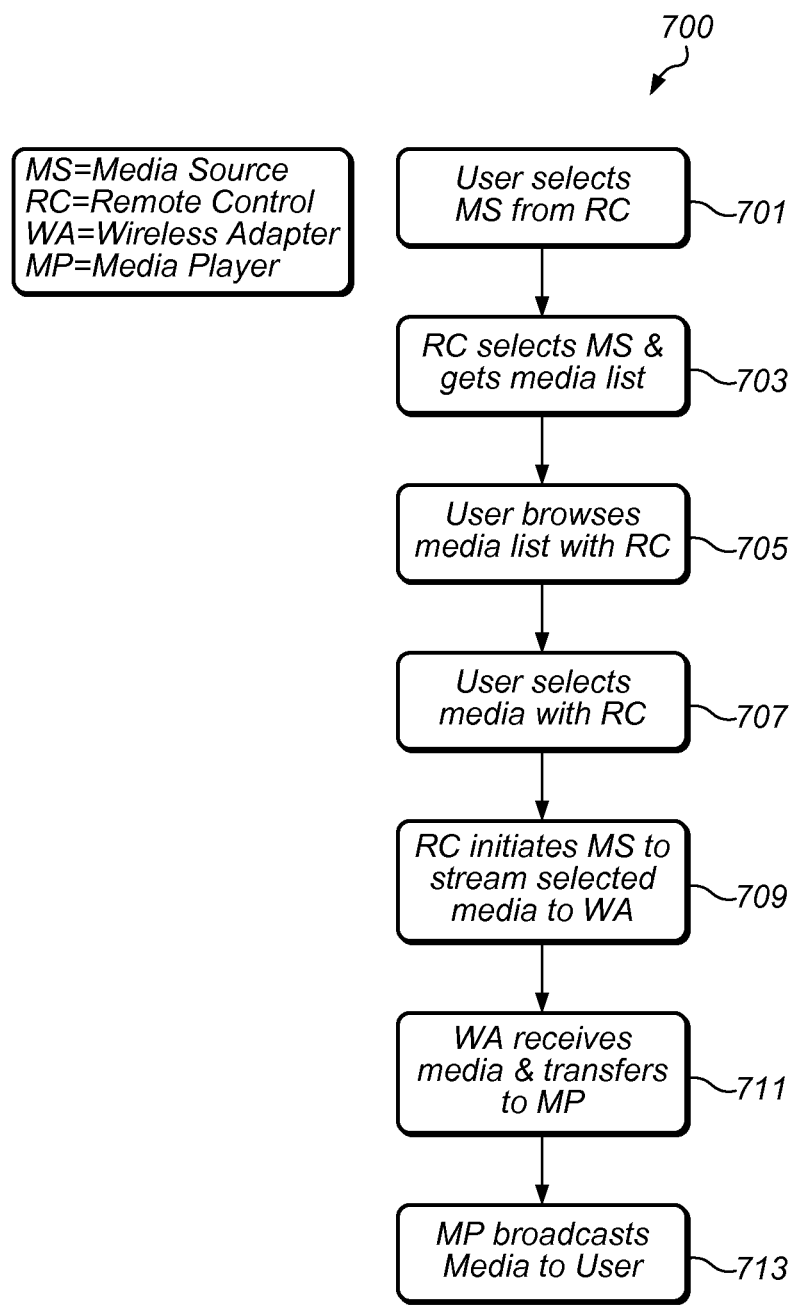
FIG. 7 illustrates a process by which a remote controller enables communication between a media source and a media player, according to one embodiment of the invention.

As shown in FIG. 7, the RC 108 receives user input via the keyboard 616 to select a media source 106 in step 701. The RC 108 then sends an instruction to the selected media source 106, and in response, receives information (e.g., a list of content items available at the selected media source 106) in step 703. The transmission of the instruction and reception of information from the media source 106 occurs via the wireless interface 610. The media processor 612 may process the received information, and display it using the display 602. Alternatively, the received information may be transmitted to the wireless adapter 102, and may be displayed by the media player 104 (e.g., a TV) connected thereto.

In step 705, the user may browse the displayed content (e.g., scroll or search through the content), and select one or more content items using the keyboard 616 in the step 707. Accordingly, in step 709 the RC 108 sends another instruction to the selected media source 106 and the wireless adapter 102, so as to establish a wireless link between the media source and the adapter. Moreover, the RC 108 instructs the selected media source 106 to send the content items selected by the user in step 707 to the wireless adapter 102. The wireless adapter 102 coupled to the media player 104 receives the content items in step 711, and in step 713 the media player 104 renders the selected content items, as described above with reference to FIGS. 1 and 2.

Referring again to FIG. 1, one or more of the wireless connection between the RC 108 and the wireless adapter 102, the RC 108 and the media source 106, and the media source 106 and the wireless adapter 108 can be a wireless local-area network WLAN or WiFi. As a result various WiFi-enabled media sources can be readily accessed using the RC 108 and the wireless adapter 102 without requiring substantial additions and/or modifications to the media sources, thereby keeping the cost of the overall system low. In addition, because both the RC 108 and the wireless adaptor 102 employ the same wireless technology, an additional interface between the two may not be needed.

Figure 8:
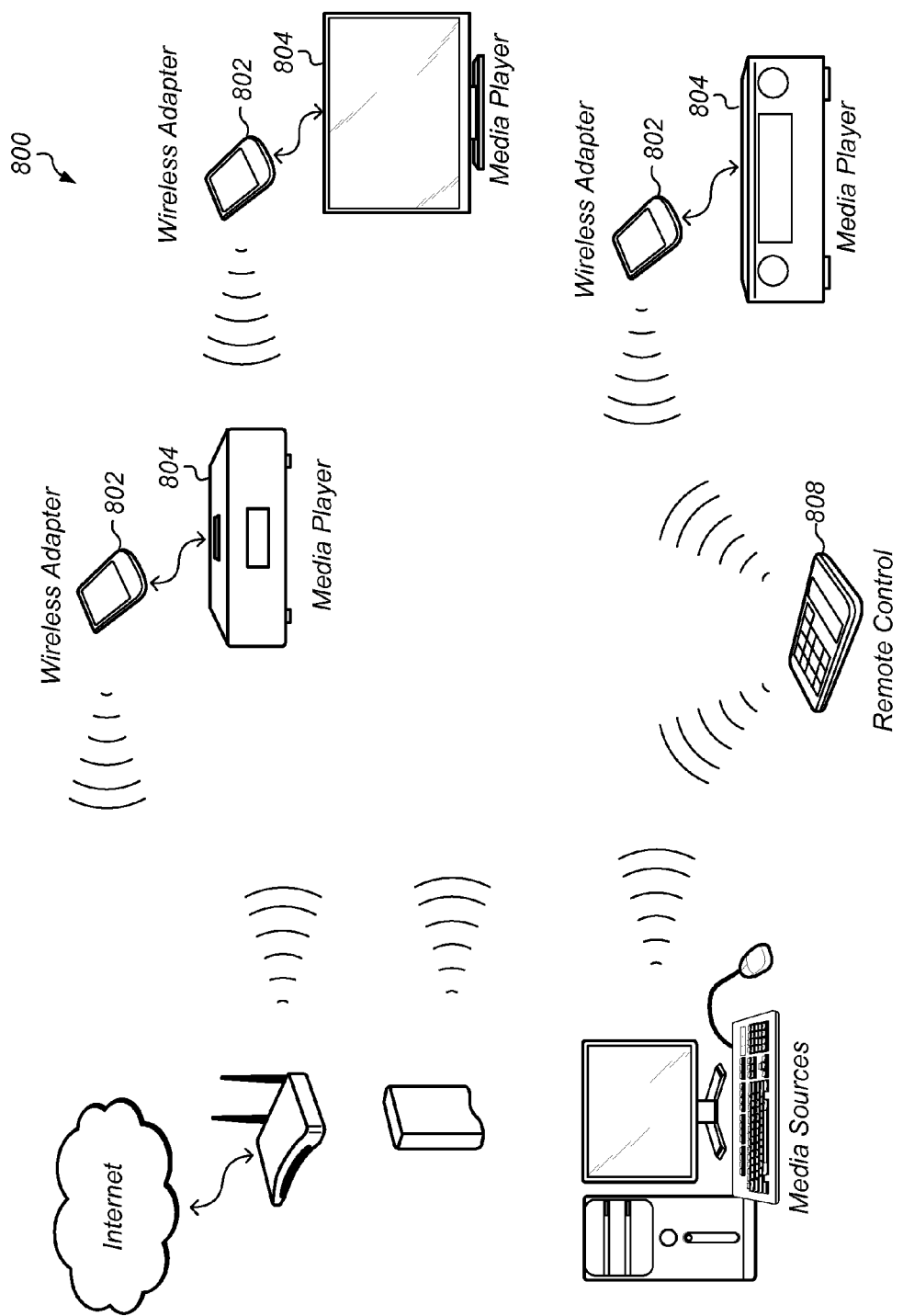
FIG. 8 shows a media system in which a single remote controller according to an embodiment of the invention can control a number of wireless adapters.

As shown in FIG. 8, the RC 808 can control multiple wireless adaptors 802 each of which is connected to a different media player 804. These media players include, but are not limited to, digital TVs, set-top boxes, home theaters, digital photo frames, A/V Receivers, table-top radios, kitchen radios, and iPOD speaker docks. In the system of FIG. 8 the cost benefits can be substantial because each additional wireless adaptor eliminates the need for, and cost of, a display, keyboard, and processor for controlling each additional media player 804. Moreover, as explained in detail below the user may control multiple or even all media players using only one remote control 808 from any location accessible via a home network, thus eliminating or mitigating the need for carrying around a number of remote controllers.

In some instances, different media sources that may be accessed by the RC 108 shown in FIG. 1 may use different formats and/or protocols for the exchange of content and/or control information. The media processor 612 may generate instructions using a protocol and format recognized by a certain media source, and may also reformat the information received from that media source so that it may be displayed to a user, as described above.

Figure 9:
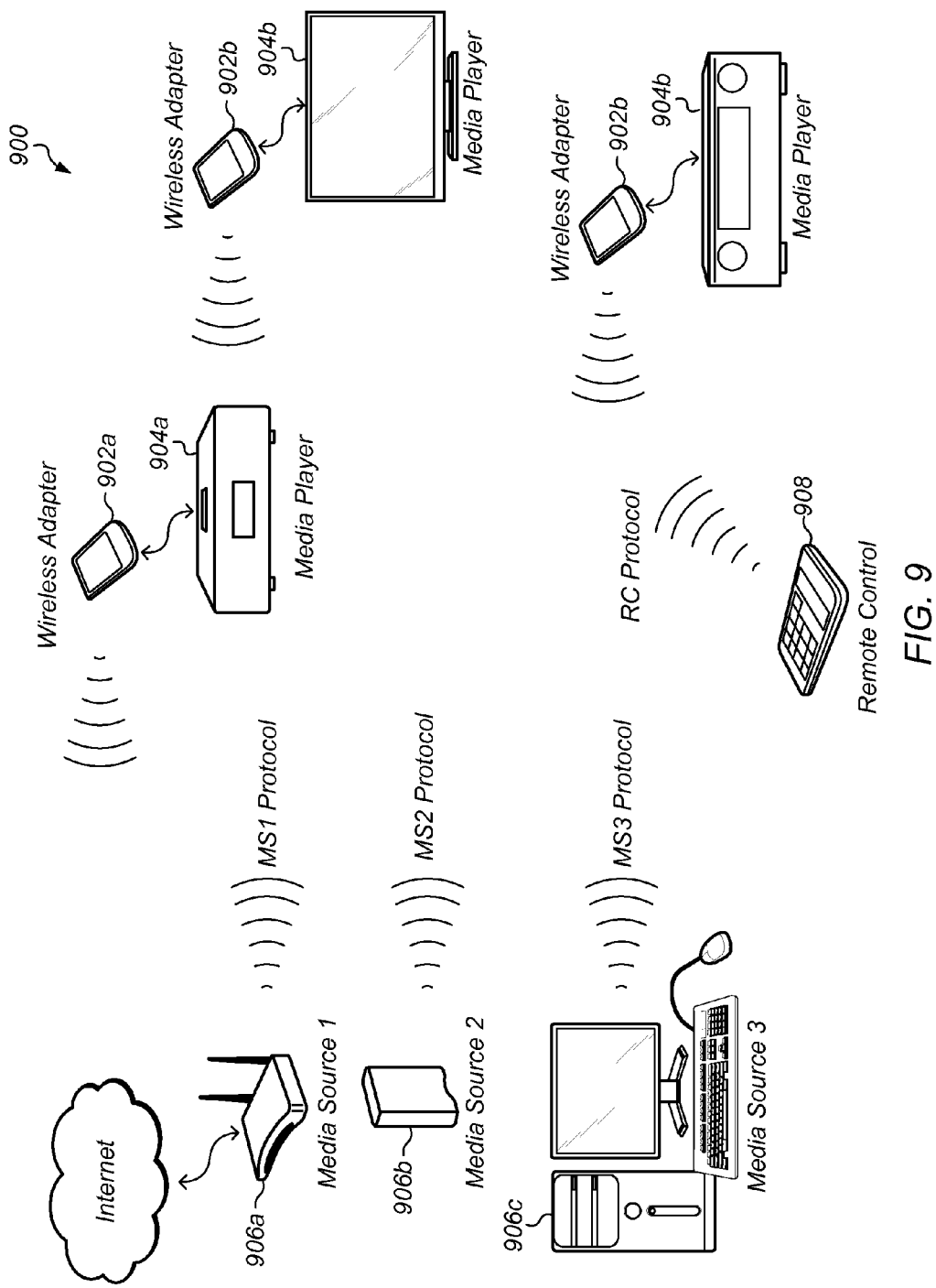
FIG. 9 shows a media system including three media sources, three wireless adapters, three media players, and a single remote controller.

Alternatively, an RC may communicate with one or more media sources via one or more wireless adapters, as illustrated with reference to FIG. 9. The media system 900 includes three wireless adapters 902a, 902b, 902c, connected to a radio 904a, a TV 904b, and a sound system 904c, respectively. The media system 900 also includes three content sources 906a, 906b, 906c, each of which employs a different communication protocol, and an RC 908. In order to facilitate delivery of content from the content source 902a to the radio 904a, the RC 908 provides instructions to the wireless adapter 902a. The adapter 902a modifies the received instructions according to the protocol recognized by the media source 906a, and forwards the modified instructions thereto. The wireless adapter 902a then receives information from the source 906a, and modifies and delivers it to the RC 908 in a format compatible therewith.

As described above with reference to FIG. 7, a user then selects one or more content items, and the RC 908 sends the selection information to the wireless adapter 902a. The adapter 902a reformats the selection information, if necessary, and sends additional instructions to the media source 906a using an appropriate protocol. Thereupon, the adapter 902a receives the selected content items from the media source 906a for playback by the radio 904a, as described above with reference to FIGS. 1, 2, and 7. In the discussion above, references were made to only one media source (906a) and one wireless adapter (902a) for the sake of convenience only. In general, in the system 900, any one of the wireless adapters 902a, 902b, 902c can communicate with the RC 908 and any one of the media sources 906a, 906b, 900c.

In the various media systems described above, a remote controller typically facilitates streaming of content from one or more media sources to one or more media players. Typically, the media sources offer a number of features such as browsing or searching for available content, downloading additional content from the Internet, tagging certain content items as favorite, etc. Similarly, the media players commonly offer features such as volume and picture control, pausing, rewinding, fast-forwarding, etc. Some networked media players may support rendering content from multiple sources—such as iPod, internet stations, USB Storage and storage connected to local area networks. The user experience can be enriched if the remote controller that controls streaming of content can also allow controlling the various media sources and players according to their respective features.

Figure 10:
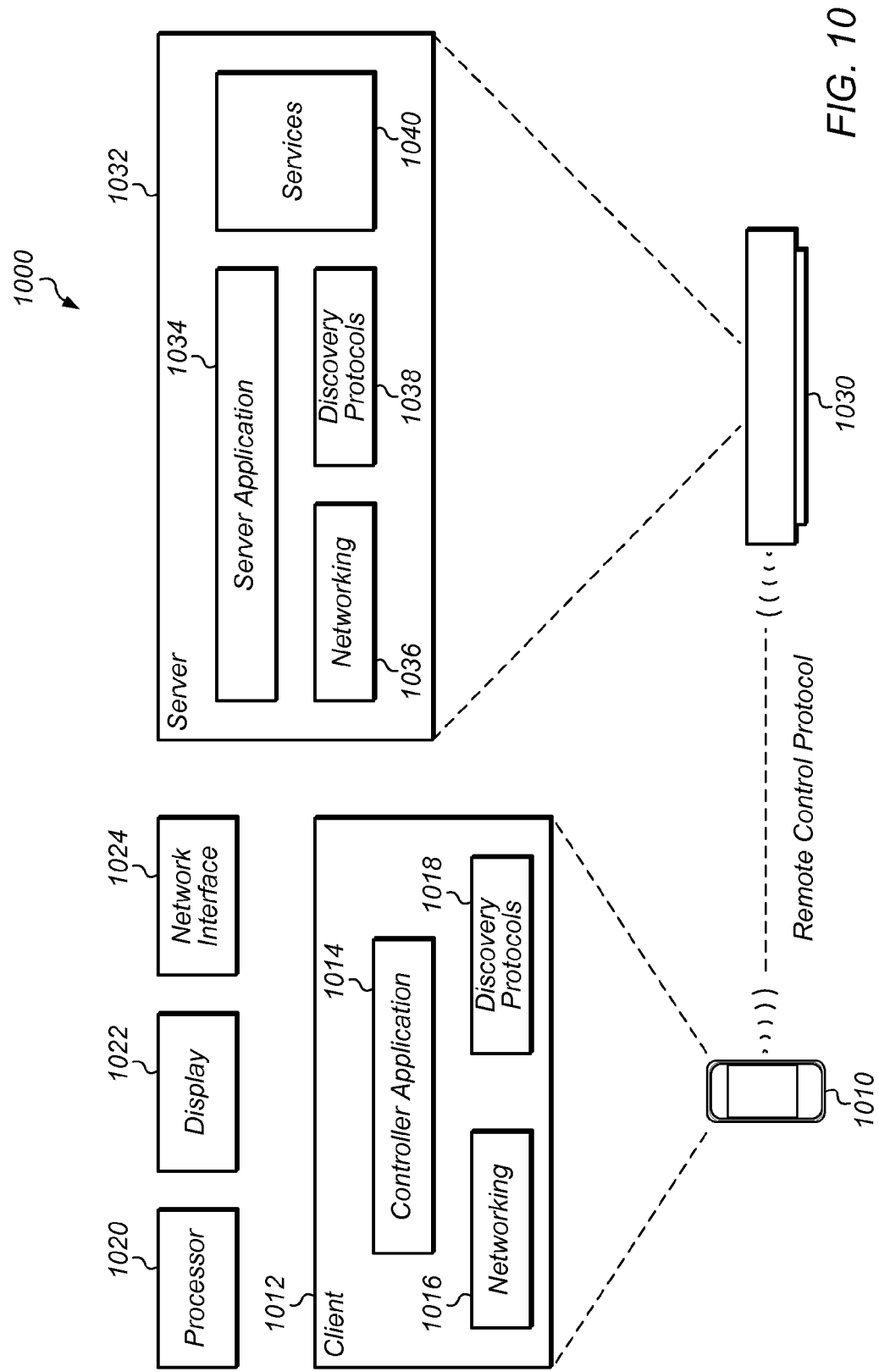
FIG. 10 shows a media system in which a remote controller controls various media sources and players.

Accordingly, the media system 1000 illustrated with reference to FIG. 10 includes a remote controller (RC) 1010 and a media source 1020. The RC 1010 can be a stand-alone device. It can also be another computing device capable of wireless communication (e.g., a smart phone, PDA, a game consol, tablet PC, etc.) configured using software as a remote controller, as described above. The RC 1010 includes a client 1012 that may be implemented in software, as custom logic hardware (e.g., an integrated circuit), or as a combination of software and custom logic. The client 1012 includes a controller module 1014, a networking module 1016, and discovery protocols 1018. The RC 1010 also includes a processor 1020 for executing the client 1012, if implemented entirely or in part in software, a display 1022, and a network interface 1024.

Similarly, the media source 1030 includes a server 1032 that may also be implemented in software, hardware, or as combination thereof. The server 1032 includes a server application 1034, a networking module 1036, discovery protocols 1038, and a services module 1040. The media source 1030 also includes a network interface 1042. In general, the RC 1010 can be used to control not only the media source 1030 but also a media player and/or a wireless adapter connected to a media player or source that does not directly support wireless networking. Thus the server can be implemented in any of these devices (i.e., media source, media player, and wireless adapter).

The RC 1010, using the networking interface 1024, the networking module 1015, and the discovery protocols 1017, detects one or more media devices (i.e., media sources and players, and media adapters) that may communicate with the RC 1010. Upon detecting the media source 1030, the RC 1010 seeks to establish communication with the media source 1030. The media source 1030 may request a "shared secret" (e.g., an identifier key, password, etc.) to determine if the RC 1010 may be granted access. A user may provide the password using a user interface (e.g., a keyboard) of the RC 1010. After the media source 1030 verifies the shared secret, it may grant access to the RC 1010, and the two devices are designated as "paired." If the RC 1010 seeks access at another time, the media source 1030 may recognize the previously paired remote controller, and may not require re-authorization.

Although the pairing between the RC 1010 and the media source 1030 is described above, it should be understood that the RC 1010 can be paired with any media device including media sources and players, and wireless adapters connected to such media devices. In general, one remote controller may be paired with more than one media device, and the remote controller may build a UI corresponding to each media device with which it is paired. The RC may present a list of all media devices that can be controlled, and when the user selects one of those devices, the corresponding UI is invoked. In some instances, the media source 1030 (a media device, in general) uses its discovery protocols 1038 to identify itself to the RC 1010. To this end, the media source 1030 broadcasts via the network interface 1042 over a direct communication channel or via a WLAN information known as media-system identity element, so that the RC 1010 recognizes that it may control the media-source 1030. A media device may be paired with more than one remote controllers at different times, or at the same time. Furthermore, a number of media devices may identify themselves to the RC 1010, and in response, the RC 1010 may present a list of such devices to the user in the display 1022. The user may select all or a subset of the media devices, and then the RC 1010 may establish communication with only the selected media devices.

Once paired (i.e., authorized or determined to be previously authorized), communication is established between the RC 1010 (using the networking module 1016 and the network interface 1024) and the media source 1030 (using the networking module 1036 and the network interface 1042). Such a communication can be established directly, i.e., via an infrared link, or direct wireless link, or indirectly, via a WLAN. The controller 1014 queries the features of the media source 1030, and the server application 1034 provides the features to the controller 1014 over a bidirectional communication channel. The features may include types of media, methods in which the media is indexed and/or searched (i.e., by name, artist's name, year of publication, etc.), whether new content can be obtained by the media source 1030, etc. Upon receiving information about the features, the processor 1020 builds a user interface (UI) suitable for controlling the media source 1030, and the UI is displayed on the display 1022. The display may include a simulated keyboard, or the RC 1010 may include an actual keyboard.

In some embodiments, the UI may be hierarchical, that is, based on a user's selection of an option in the UI, another UI presenting more options is presented. For example, if the RC 1010 controls a media player such as a TV, one of the features that the RC controls may be picture attributes. When a user selects the picture option from a UI, another UI can be presented allowing the user to select brightness, contrast, colors, etc.

Because the UI is built by the RC 1010, the UI can be adjusted according to the attributes of the RC 1010 (or the device configured as the RC 1010), such as display size, resolution, available memory, etc. Importantly, the server 1032 need not receive this information and create a UI, and only needs to provide the media-source features to the RC 1010. As a result, the RC 1010 can interoperate and control a variety of media sources and players that are agnostic to the RC 1010. Furthermore, the RC 1010 can cache the information received from the server 1032 such as types of content available, a list of available content items, format of those content items, communication protocols employed by the media source 1030, and options related to a feature, such as options related to picture control, etc. Therefore, during subsequent communications with the media source 1030, the amount of data exchanged can be minimized.

When the user wishes to control the media-source 1030, the user provides a command via the UI. Examples of such commands include selection of a specific content type, selection of a content item, transmission of the item to a media player, deletion of the selected item, marking an item as a favorite item, and checking if new content is available, etc. If the media device controlled by the RC 1010 is a media player, the commands may include playing or stopping playing of an item, adjusting volume, modifying picture attributes, and/or sound attributes, rewinding, fast-forwarding, searching, etc. The processor 1020 generates instructions using a suitable protocol and the networking module 1016 and the networking interface 1024 transmit the instructions to the server 1032 via the communication link. The server application 1034 analyzes these instructions, and, together with the services module 1040, generates control signals so as to adjust one or more attributes of the media source 1030. A media player can be controlled in a similar manner. In general, the RC 1010 communicates with the server 1030 only when a change in the current state of the media-source 1030 (or a media player), i.e., a change in the media devices one or more attributes described above, is sought.

The media system 1000 is based on a flexible layered architecture that allows tailoring the system 1000 for remote control of various multimedia applications and services. A remote-control protocol defines a framework for packet exchange of extensible commands, customizable for remote control of diverse applications. The remote-control protocol operates on top of the transport protocol that provides a framework to transmit control commands and receive their responses. A suitable programming language, such as hypertext markup language (HTML), extensible markup language (XML) or Java Script Object notation (JSON) may be used for the purpose of exchanging commands and responses using a remote-control protocol.

The remote-control protocol may allow the client on the remote controller (e.g., the client 1012) to inquire about the state of the media device. Examples of information that may be retrieved as a part of the media-device state include currently selected audio source and current state of the media player (e.g., on or off, playing content from a certain source, volume level, etc. Alternatively or in addition, when the media-device-state changes, or at pre-determined intervals the server in the media device (e.g., the server application 1034) may send the state information to the client in the remote controller. In some instances, the RC 1010 receives information about a content item currently played (e.g., track number, artist's name, album name, time remaining on the track, progress indicator, etc.) from a media device, and displays it on the display 1022.

In some embodiments, the remote controller controls a number of media sources and players (e.g., the media system 900 shown in FIG. 9), some of which may employ different communication protocols than the others. The client in the remote controller uses an appropriate remote-control protocol to communicate with various media devices. It then obtains types of content and lists of content available on each media source, and builds an aggregate view of all available media content types and those items that can be played by the players in the media system. The aggregate view of the available media content types and items is presented to the user in a comprehensive and intuitive fashion. Based on the media content type or items selected by the user, the client determines which media sources and/or players and required services are suitable for use. For example, for browsing video clips a DVR may be selected as a source, and a TV may be chosen as a player, or if available, both a TV and a sound system may be chosen as players. The content may then be streamed to the selected media players from the selected sources, e.g., as described with reference to FIGS. 3-5. Moreover, command from a user may be translated by the processor 1020 according to a control or communication protocol corresponding to the media device to be controlled, and may be transmitted to that media device.

In some embodiments the client on the remote controller configures various media sources and players to operate in "party mode." In party mode multiple media devices collaborate to provide an enriched user experience. One media device is designated as master and the other media devices are designated as attendees. When operating in party mode the media device designated as the master controls distribution of content to the attendees, which render the received content.

While the invention has been particularly shown and described with reference to specific embodiments, it will be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

What is claimed is:

1. A remote controller for communicating with a media source and a media player, the remote controller comprising:
   a wireless interface configured for establishing (i) a first wireless communication link between the remote controller and the media player, and (ii) a second wireless communication link between the remote controller and the media source;
   a network interface configured for:
   (i) communicating with the media source via the second wireless communication link, wherein the communication with the media source comprises first information describing content available on the media source, and
   (ii) communicating with the media player via the first wireless communication link, wherein the communication with the media player comprises second information describing a set of controls supported by the media player;
   a processor configured for:
   (i) determining compatible content available on the media source wherein the compatible content is in a format that is compatible with a feature of the media player, wherein the feature is selected from a group consisting of: volume control, picture control, rewind, and fast forward, and (ii) building a user interface for controlling the media player using the set of controls supported by the media player and for selecting compatible content from the media source; and
   (iii) controlling the media player via the user interface by providing a media player command to the media player via the first link;
   (iv) controlling the media source by providing a media source command to the media source via the second link wherein the media source command results in the transfer of selected content from the media source to the media player via a third wireless communication link.

2. The remote controller of claim 1, wherein at least one of the first, second, and third wireless communication link is established via a WLAN.

3. The remote controller of claim 1, wherein the wireless interface is configured for receiving data from the media source via the second link, the remote controller further comprising a display unit for displaying the received data.

4. The remote controller of claim 1, further comprising a user interface for receiving a user command, wherein at least one of the player command provided to the media player and the source command provided to the media source is based on the received user command.

5. The remote controller of claim 1, further comprising a scanner for identifying at least one media device, wherein the at least one media device is one of the media player, the media source, and a wireless adapter in communication with the media player or the media source.

6. A remote controller for communicating with a media source and a media player, the remote controller comprising:
   a network interface for:
   (i) communicating with the media player via a first wireless communication link, wherein communicating comprises transmitting media player commands to the media player and receiving first information therefrom describing a set of controls supported by the media player; and
   (ii) communicating with one or more media sources via a second wireless communication link wherein communicating comprises transmitting media source commands to the one or more media sources and receiving therefrom second information describing content items available by the one or more media sources;
   a processor for:
   (i) analyzing the received first information so as to identify at least one feature of the media player
   (ii) determining compatible content available on the one or more media sources wherein the compatible content is in a format that is compatible with a feature of the media player, wherein the feature is selected from a group consisting of: volume control, picture control, rewind, and fast forward, and
   (iii) building a user interface for controlling the media player using the set of controls
   (iv) creating a user interface for controlling the media player and for selecting compatible content from the one or more media sources, wherein the user interface is created based on the set of controls supported by the media player and built to display content from the one or more media sources determined to be compatible with the media player.

7. The remote controller of claim 6, wherein the information transmitted to the media player comprises a signal generated by the controller in response to a command received via the user interface.

8. The remote controller of claim 6, wherein the display module displays the information received from the media player.

9. The remote controller of claim 6, where in the information associated with the available content items includes at least one of: a title of a content item; a type of a content item; and a performer of a content item.

10. The remote controller of claim 6, further comprising a scanner for selecting the media player and the one or more media sources by scanning a network for available media players and media sources.

11. The remote controller of claim 6, wherein:
the network interface simultaneously communicates with one or more additional media players; and
the processor (i) analyzes the received information from each of the one or more additional media players, and (ii) creates one or more additional controllers for controlling the corresponding media player of the one or more additional media players.

12. The remote controller of claim 11, wherein the processor aggregates the information received from the media player and the information received from each of the one or more additional media players, and the display module displays the aggregated information.

13. A method for remotely controlling a media source and a media player, the method comprising:
establishing a first wireless communication link between a remote controller and the media player;
establishing a second wireless communication link between the remote controller and the media source;
receiving first information from the media source wherein the first information describes content available on the media source;
receiving second information from the media player wherein the second information describes a set of controls supported by the media player;
determining, based on the first information and the second information, the content available on the media source that is compatible with a feature of the media player, wherein the feature is selected from a group consisting of: volume control, picture control, rewind, and fast forward;
building a user interface for controlling the media player using the set of controls supported by the media player and for selecting compatible content;
transmitting a media player command to the media player via the first wireless communication link; and
transmitting a media source command to the media source via the second wireless communication link, thereby causing the media player to receive a content item, for rendering thereof, from the media source over a third wireless communication link between the media source and the media player.

14. The method of claim 13, wherein at least one of the first, second, and third wireless communication links is established via a WLAN.

15. The method of claim 13, further comprising: receiving, at the remote controller, data from the media source via the second wireless communication link; and displaying the received data.

16. The method of claim 13, further comprising receiving a user command at the remote controller via a user interface, and wherein at least one of the player command and the source command is based on the received user command.

17. The method of claim 13, further comprising identifying at least one media device from one or more media devices, wherein the at least one media device is one of the media player, the media source, or a wireless adapter in communication with the media player or the media source.

* * * * *